March 15, 1960     A. W. LOUCONY     2,928,533
CAKE DECORATING KIT
Filed Feb. 16, 1959

INVENTOR
Adolphe W. Loucony
BY Johnson and Kline
ATTORNEYS

United States Patent Office 2,928,533
Patented Mar. 15, 1960

2,928,533

CAKE DECORATING KIT

Adolphe W. Loucony, Bridgeport, Conn., assignor to Lorraine Novelty Manufacturing Co., Inc., Bridgeport, Conn., a corporation of Connecticut Application February 16, 1959, Serial No. 793,498

4 Claims. (Cl. 206—16)

The present invention relates to a cake decorating kit that includes a tube having a plunger and nozzles having outlets of different shapes interchangeable on the tube and more particularly to the assembly of the tube and nozzles into a unitary package.

While it has heretofore been proposed to provide cake decorating kits like the above noted type having a tube with a plunger and nozzles having various shaped exits to provide for different configuration of icing, these kits have had no provision for holding the nozzles other than their being loosely associated with the tube. Thus, upon use, difficulty has been experienced in first, selecting the desired nozzle; secondly, in not losing the loose nozzles, which were not attached to the tube or a container and thirdly, in maintaining the kit complete after repeated use.

It is accordingly an object of the present invention to provide a cake decorating kit in which the tube and nozzles are secured together to form a unitary package.

Another object of the present invention is to provide for such a cake decorating kit in which the disassembly of the kit causes each nozzle to be readily available for selection and use with a minimum amount of effort.

A further object of the present invention is to provide a kit according to the above objects which is economical to manufacture, contains a minimum number of parts and which may be easily and effectively packaged.

In carrying out the present invention, there is provided the usual cake decorating utensil of a tube in which a plunger is manually, axially moved. The tube at one end is provided, in the specific embodiment shown, with an outlet which is threaded so that nozzles which also have threaded portions may be readily secured to the tube. It will be appreciated that by filling the tube with icing, movement of the plunger forces the icing out through the exit in the nozzle and that by interchanging nozzles having different shaped exits on the tube, streams of icing having different shapes may be formed.

In carrying out the present invention, in order to form a unitary package of the cake decording parts, there is provided an annular plate having a central portion which threadably receives the threaded outlet of the tube. The plate additionally has a peripheral flange and disposed between the central portion and the flange is an inclined portion on which the nozzles are positioned. In order to secure the nozzles, tube and plate together the tube has an inwardly extending shoulder adjacent the threaded outlet while each of the nozzles has an inwardly projecting shoulder adjacent the threaded portion. When the tube is threaded onto the annular plate and the nozzles are positioned on the inclined portion of the plate with their exits upwardly directed, the shoulder of the tube engages and clamps the shoulders of the nozzles between it and the plate while the inclined portion and the flange prevent outward escape of the nozzles. There is thus provided a unitary package which may be easily disassembled for use, with each of the nozzles readily available both for selection, by having their exits pointed upwardly, and for use, by solely resting on the plate and on which the nozzles not being used are contained.

Other features and advantages will hereinafter appear.

Figure 1:
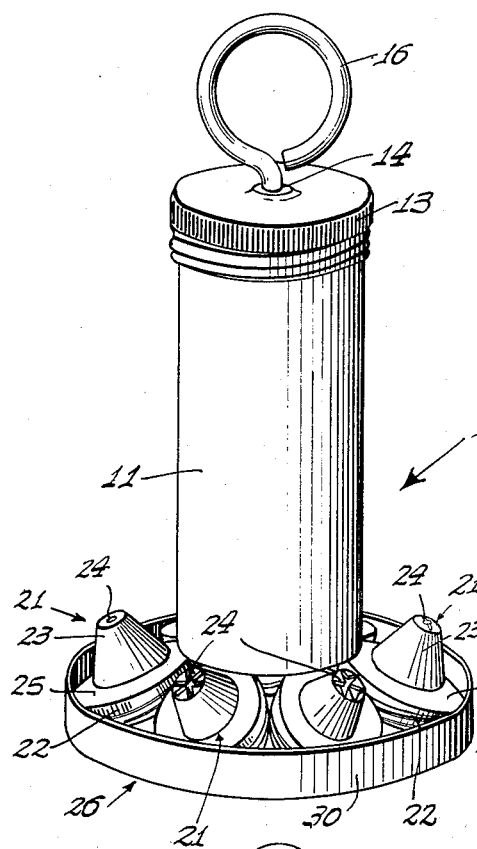
Figure 1 is a perspective view of the cake decorating kit of the present invention in assembled condition.
Figure 2:
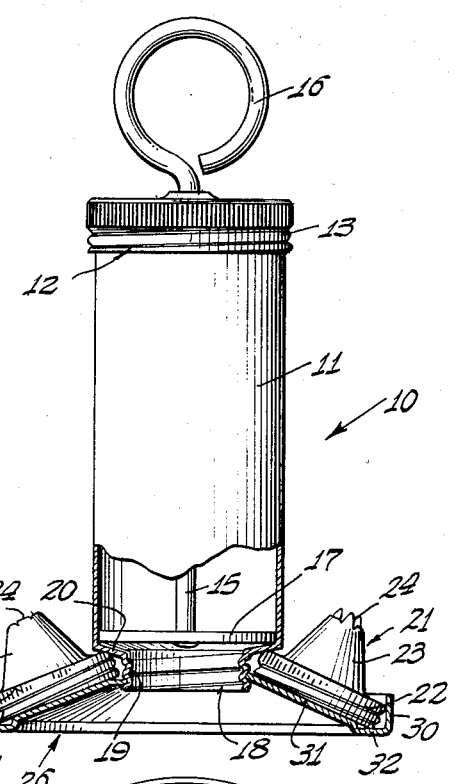
Fig. 2 is an elevation, partially in section, of the kit shown in Fig. 1.

Referring to the drawing, the kit is generally indicated by the reference numeral 10 and includes a tube 11 which is substantially cylindrical and at its upper end is formed to provide threads 12 to threadably engage a cap 13. The cap has an aperture 14 in which is slidably movable an operating arm 15. Attached at the upper end portion of the arm 15 is a handle 16 while a disk 17, having a diameter slightly less than the internal diameter of the tube, is secured to its other end. It will be appreciated that the elements 15, 16 and 17 constitute a manually operable plunger. The other end of the tube 11 has an outlet 18 of reduced diameter which is formed with threads 19 and an inwardly extending shoulder 20 connects between the outlet and the cylindrical portion of the tube.

The kit further includes a plurality of nozzles 21 with each nozzle having a cylindrical threaded portion 22 and a substantially frusto-conical portion 23 that terminates in an exit 24. Each of the exits of the nozzles, as shown in Fig. 1, has a different shape to provide a different shape for the stream of icing forced therethrough. Interconnecting the portion 23 and the threaded portion 22 is an inwardly projecting radial flange 25.

Figure 4:
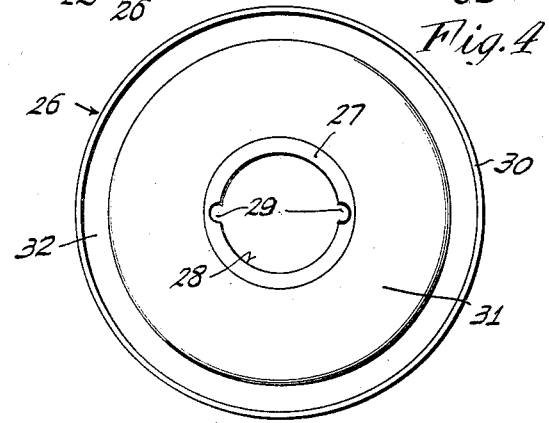
Fig. 4 is a plan of the annular plate employed in the kit of the present invention.

As shown in Fig. 4, the invention provides for forming an easily assembled and disassembled kit and to this end, there is provided a one-piece annular plate 26 which has a central portion 27 defining an aperture 28. The periphery of the central portion 27 is bent on a helix to form a thread which receives the threaded portion 18 of the tube, the cutouts 29 facilitating forming the threads. The plate 26 further has an upstanding peripheral flange 30 and disposed between the central portion 27 and the flange 30 is an intermediate portion 31 which is inclined both to the central portion and the flange 30. There is also provided adjacent the flange and the intermediate portion a radial portion 32.

Figure 3:
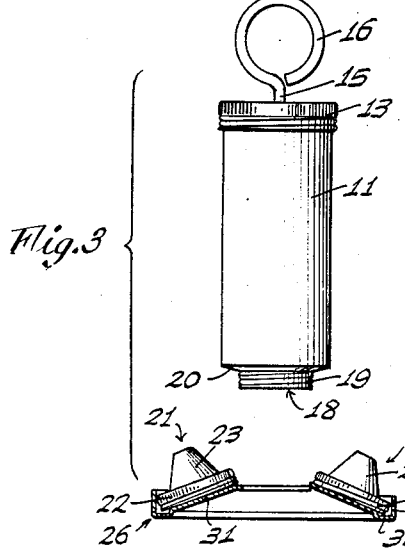
Fig. 3 is an exploded view of the kit with the tube being released from the plate to release, for use, the nozzles.

As shown in Fig. 3, each of the nozzles is placed so that the exit thereof is upwardly directed and the threaded portion rests on the inclined surface 31. There are in the embodiment shown six nozzles and these nozzles when positioned on the inclined surface 31 form substantially a complete ring around the central aperture 28, thereby making it obvious if one nozzle is missing. After positioning the nozzles in this manner, the tube 11 is then positioned to have its threaded portion 19 engage the threads of the central portion 27 and as the tube is screwed therein, the shoulder 20 abuts the portion of the shoulders 25 of each of the nozzles to clamp each nozzle between the tube and the surface 31. The part of the nozzle opposite the clamped portion engages the flange 30 and by reason of each of the nozzles resting on the inclined surface the flange 30 prevents escape of the nozzle from the plate.

By simply unscrewing the tube 11 from the plate 26, each of the nozzles is released from being clamped into a unitary kit and that they are positioned on the plate 26 with their exits facing upwardly thereby facilitating selection of the desired nozzle. It will be further appreciated that the annular plate 26 confines the nozzles so that those not being used with the tube are prevented from being accidentally lost. Moreover, upon assembly of the kit it will become apparent by a space on the inclined surface whether or not a nozzle is missing.

In the foregoing there has been disclosed a cake decorating kit which is easily assembled and disassembled to form, as to the former, a unitary package and, as to the latter, ready accessibility of each of the nozzles for selection and use. Also when one nozzle is being used in the tube, the other nozzles are confined in a selected place against accidental loss. This is accomplished by the use of an annular plate which causes clamping of each of the nozzles to the tube when the kit is assembled and which serves to confine the nozzles when the kit is disassembled.

Variations and modifications may be made within the scope of the claims and portions of the improvements may be used without others.

I claim:

1. A cake decorating kit comprising a tube formed to have an inwardly directed shoulder formed adjacent one end portion that terminates in an outlet; a plurality of nozzles; each nozzle being formed to have an outwardly directed shoulder contiguous to an end portion; and a plate formed to provide a peripheral flange and a central portion adapted to releasably retain the outlet, said nozzles being held on the plate by being clamped between the plate and the shoulder of the tube when the tube is retained on the plate.

2. A cake decorating kit comprising a tube formed to have an inwardly directed shoulder formed adjacent one end portion that terminates in a threaded outlet; a plurality of nozzles; each nozzle being formed to have an outwardly directed shoulder contiguous to a threaded end portion; and an annular plate formed to provide a peripheral flange and a central portion adapted to threadably receive the threaded outlet, said nozzles being held on the plate by being clamped between the plate and the shoulder of the tube when the tube is threaded to the plate.

3. A cake decorating kit comprising a tube formed to have an inwardly directed shoulder formed adjacent one end portion that terminates in a threaded outlet; a plurality of nozzles; each nozzle being formed to have an outwardly directed shoulder contiguous to a threaded end portion; and an annular plate formed to provide a peripheral flange and a central portion adapted to threadably receive the threaded outlet, the portion of the plate between the flange and the central portion being inclined to both, said nozzles being held on the plate by being clamped between the inclined portion of the plate and the shoulder of the tube when the tube is threaded to the plate.

4. A cake decorating kit comprising a tube formed to have an inwardly directed shoulder formed adjacent one end portion that terminates in a threaded outlet; a plurality of nozzles; each nozzle being formed to have an outwardly directed shoulder contiguous to a threaded end portion; and an annular plate formed to provide a peripheral flange and a central portion adapted to threadably receive the threaded outlet, said nozzles being held on the plate by being clamped between the plate and the shoulder of the tube when the tube is threaded to the plate, the number of nozzles being sufficient to substantially form a complete ring on the plate between the central portion and the peripheral flange.

No references cited.